United States Patent [19]

Gramse

[11] 4,304,982

[45] Dec. 8, 1981

[54] OPTICAL VIEWING SYSTEM ASSOCIATED APPARATUS AND MACHINES EQUIPPED THEREWITH

[75] Inventor: James R. Gramse, Spring Valley, Calif.

[73] Assignee: Chem-Tronics, Incorporated, El Cajon, Calif.

[21] Appl. No.: 154,043

[22] Filed: May 28, 1980

[51] Int. Cl.³ .............................................. B23K 15/00
[52] U.S. Cl. ............................ 219/121 EP; 219/121; 219/121 EL; 219/121 LZ
[58] Field of Search ................ 219/121 EB, 121 EM, 219/121 LZ, 121 EP, 121 EL, 121 EN; 350/61, 64, 81; 250/515

[56] References Cited

U.S. PATENT DOCUMENTS 3,156,810  11/1964  Samuelson ................... 219/121 EP

*Primary Examiner*—C. L. Albritton
*Attorney, Agent, or Firm*—LeBlanc, Nolan, Shur & Nies

[57] ABSTRACT

Optical workpiece viewing systsms and associated apparatus for electron beam welders and other workpiece processing machines which generate metal vapors. The subject systems have replaceable shields which keep the optical components of the system from being coated by condensation of vapors generated during the welding operation, and the associated apparatus includes an arrangement for changing shields as they become clouded which reduces to a small fraction the time conventionally required for that purpose. Workpiece processing machines with optical viewing system and related apparatus of the character just described.

26 Claims, 14 Drawing Figures

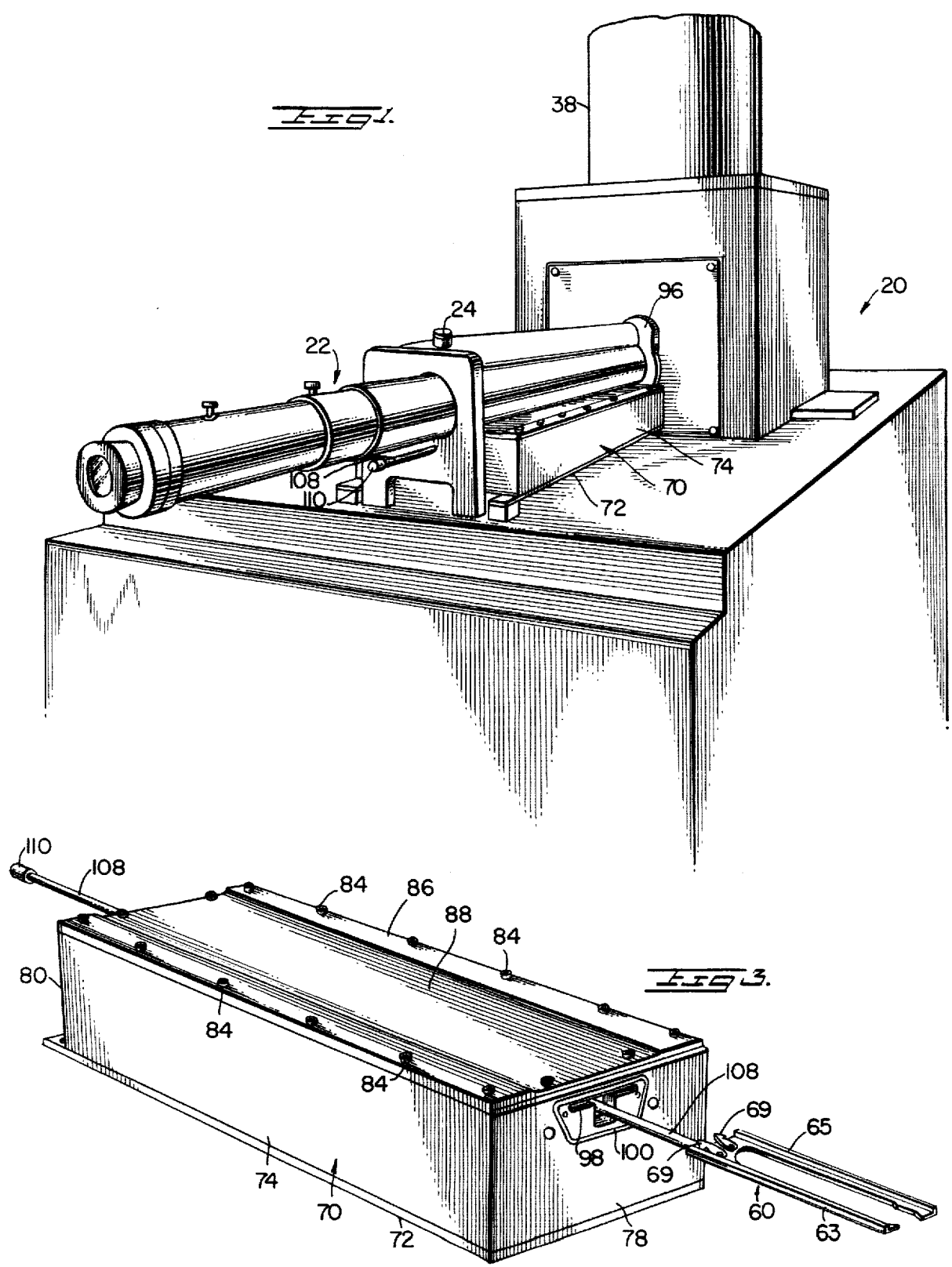

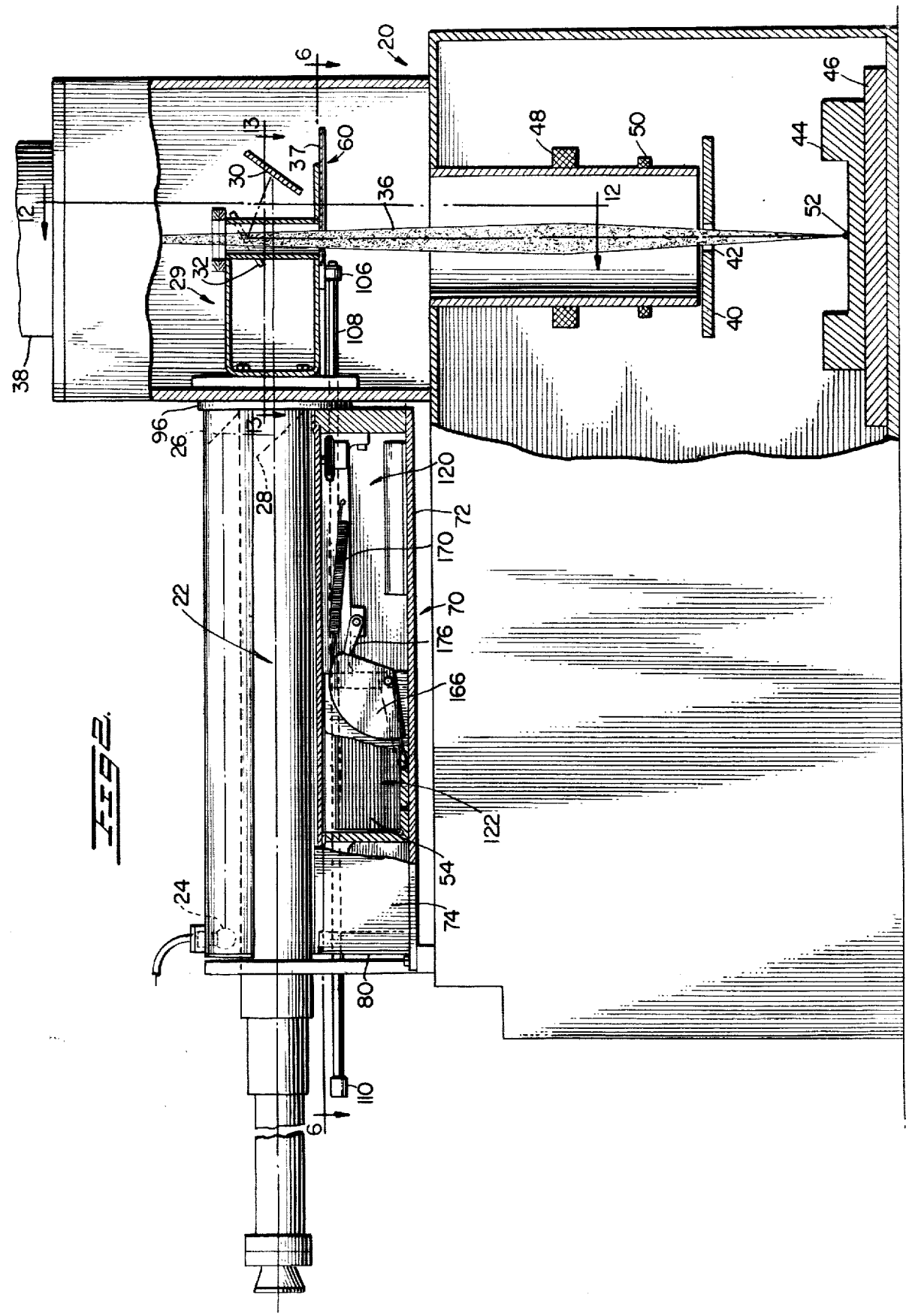

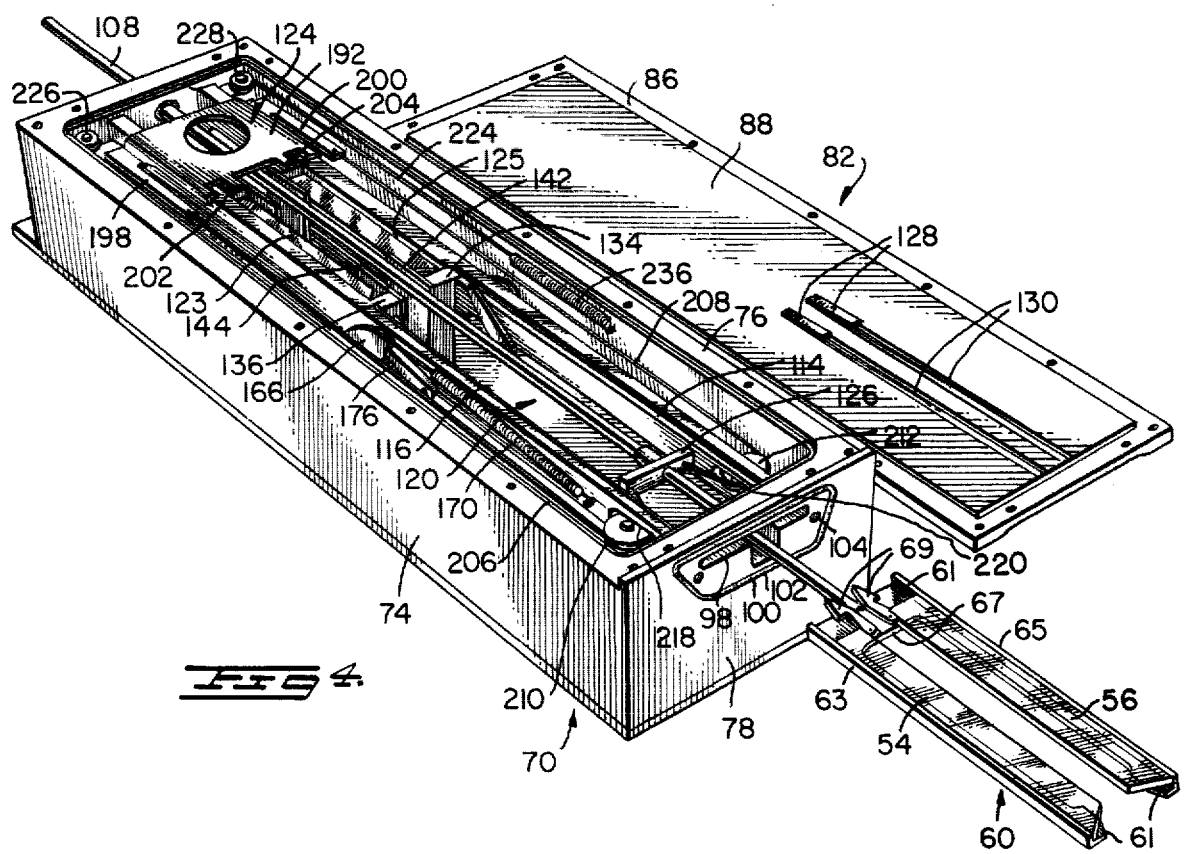
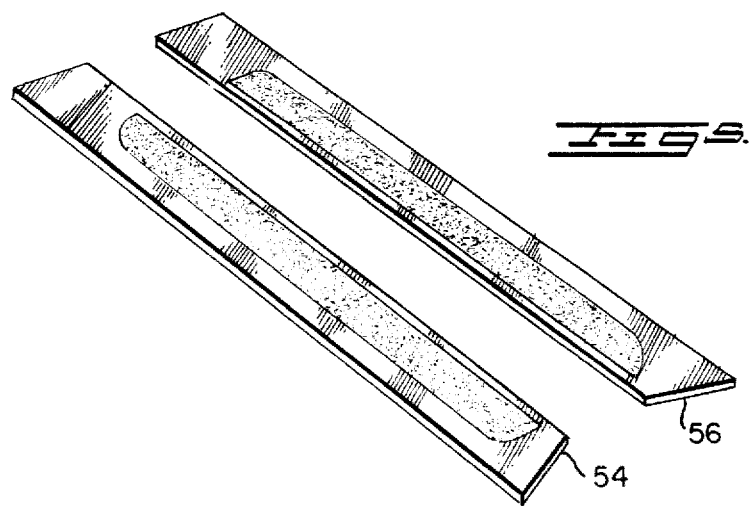

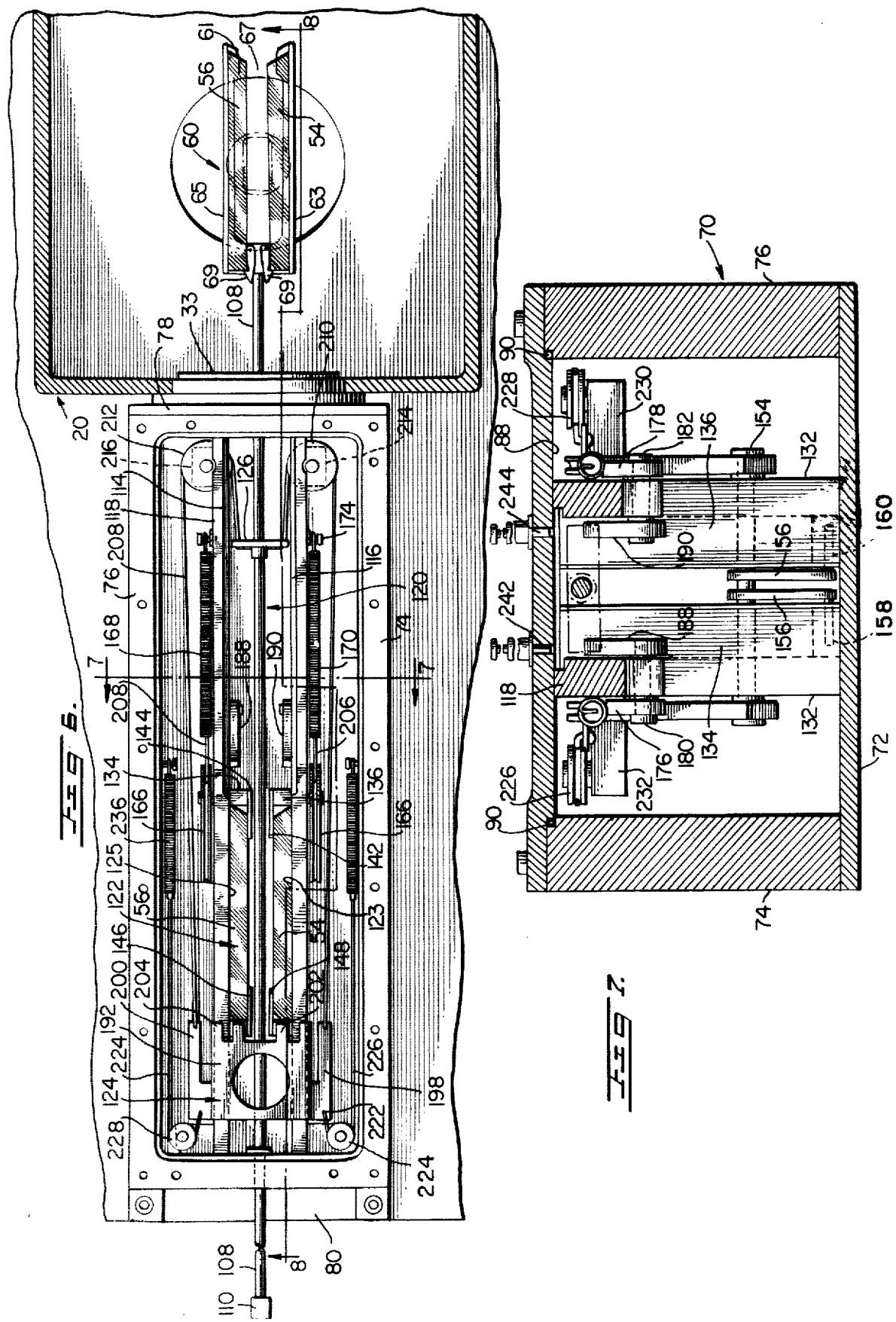

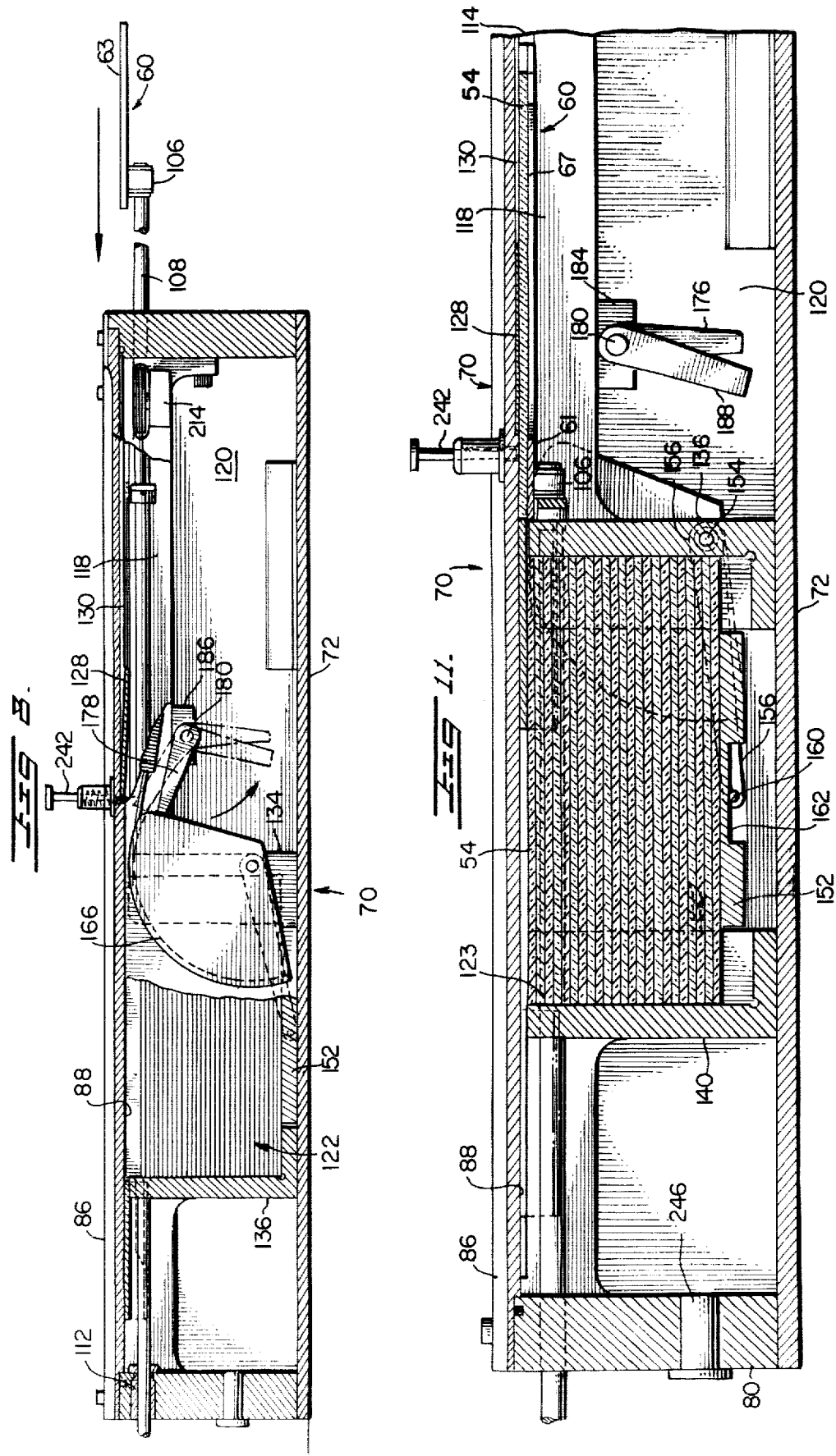

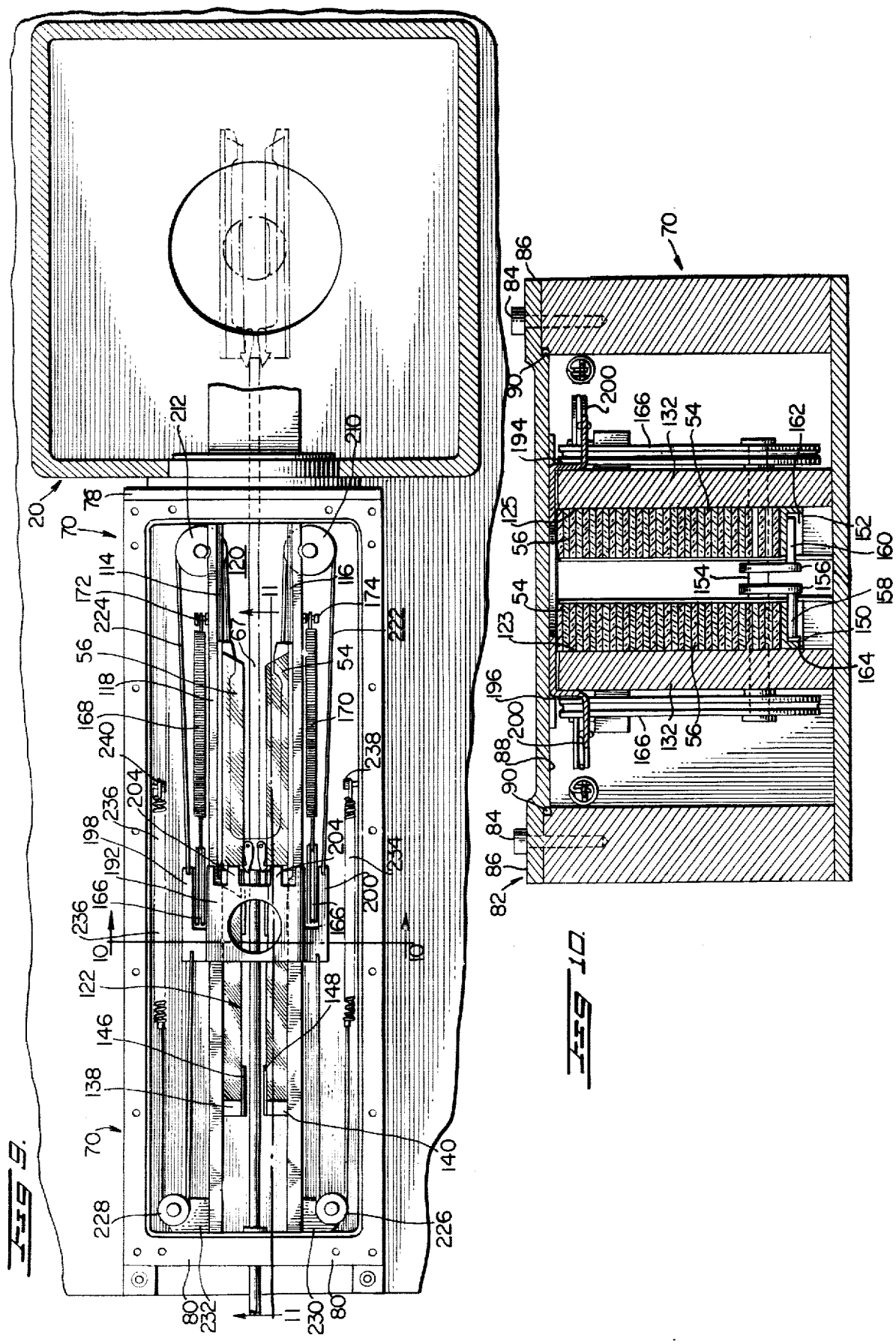

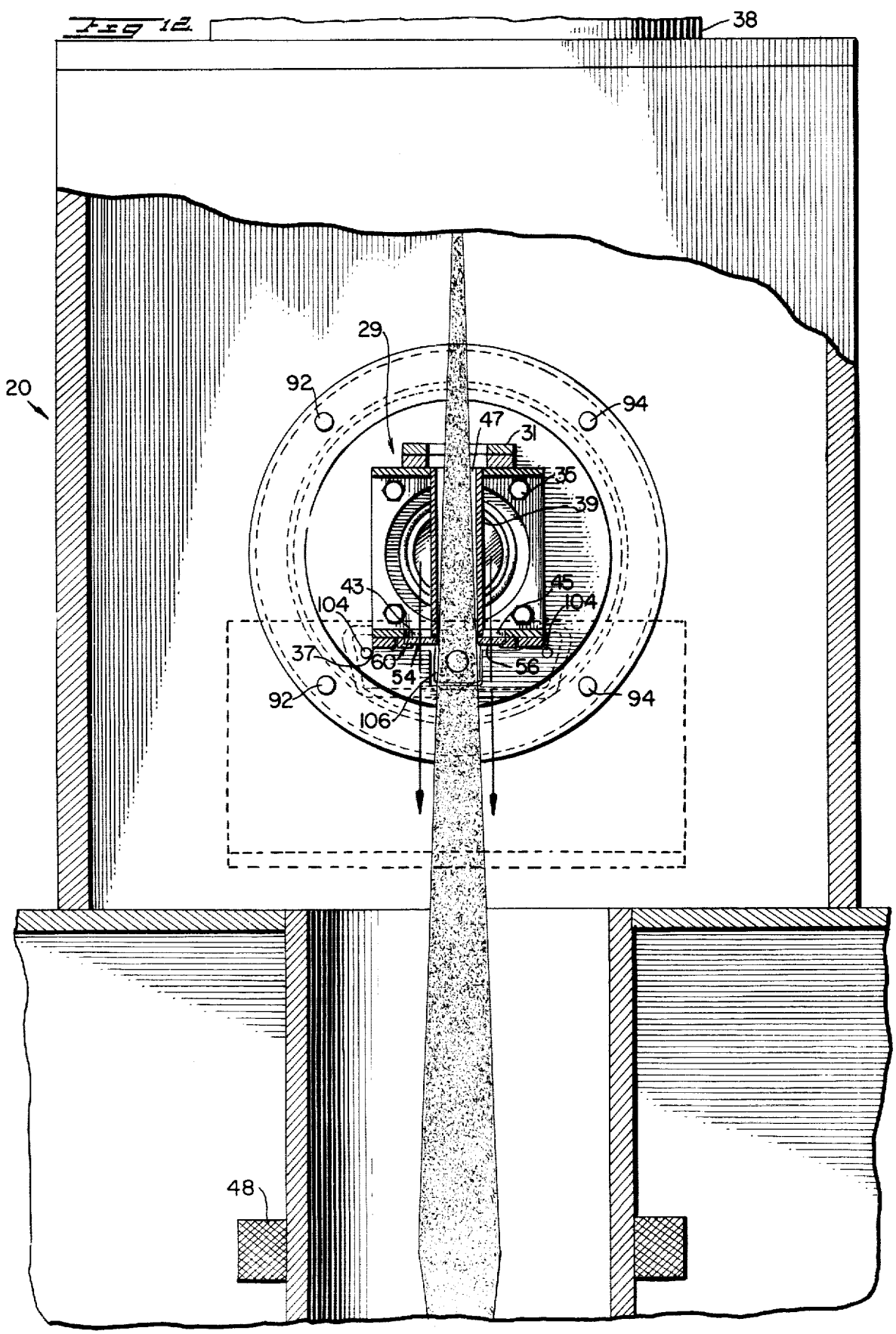

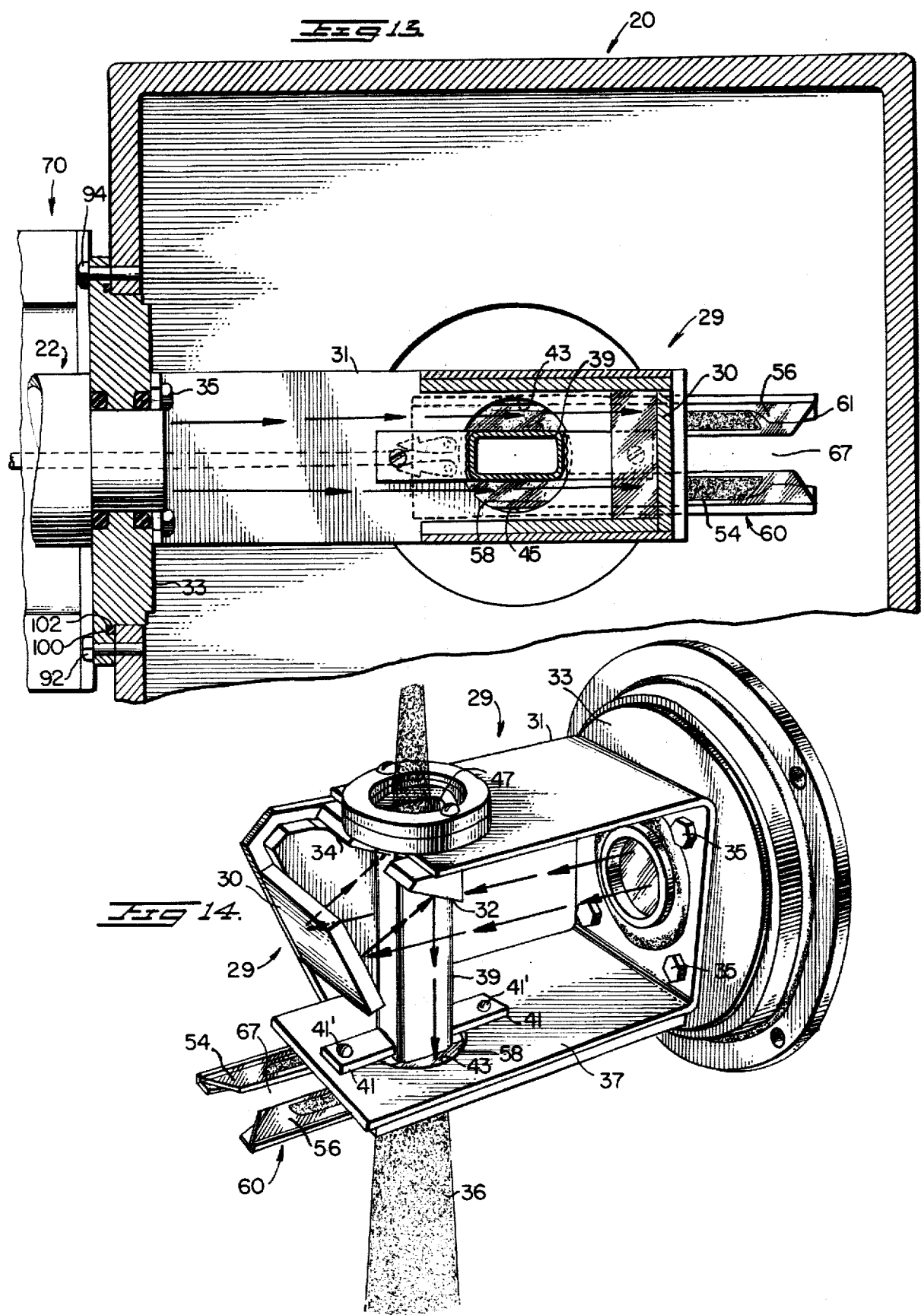

OPTICAL VIEWING SYSTEM ASSOCIATED APPARATUS AND MACHINES EQUIPPED THEREWITH

The present invention relates to machines in which metal vapors (or other vapors that condense into opaque, i.e., vision obscuring materials) are generated during a manufacturing operation.

More particularly, the present invention relates to those machines of the foregoing character which have optical systems for viewing the workpiece and light transmitting vapor shields for intercepting and protecting that system's components from such vapors; and it still more particularly relates to novel apparatus for changing the vapor shields as they become clouded by the condensation of vapor thereon.

These optical viewing systems are used in electron beam welders; and the principles of my invention will be developed primarily by reference to its application to that type of machine. It is to be understood, however, that this is being done for the sake of clarity and convenience and is not intended to limit the scope of my invention which is also applicable to other machines such as those employing electron beams for drilling and cutting and laser beams to join or shape metallic workpieces, for example.

Electron beam welders generate a fusion bond by impinging a high velocity electron beam on the workpiece being welded. Such beams cause low thermal disorder in the metal, thereby producing minimal metallurgic damage. This process consequently permits faster parts production with little disorientation of the welding components while providing superior joints.

The electron beam is generated in a high vacuum environment by heating a tungsten or tantalum cathode. The beam is formed and guided to the workpiece by well-known focusing devices such as that described in U.S. Pat. No. 2,793,281 issued May 21, 1957, to Steigerwald.

The Steigerwald welding machine employs an electron gun mounted on top of an evacuatable welding chamber. Visual optics are employed to permit viewing of the welding operation. The optical viewing system consists of a horizontally mounted monocular telescope with internal illumination and reflecting mirrors that provide an optical line of sight along the electron beam.

Cleanliness of the optical system is important so the operator can observe the weld as it is formed, and protection of the optical viewing system components from metal vapor and other contaminants during welding is therefore necessary. Typically, this protection takes the form of transparent glass vapor shields which are discarded as they become obscured by the build-up of vapor deposited metal. These shields are interposed between the workpiece and the optical components to be protected. They are typically of appreciable length so that, as an area becomes obscured, they can be displaced to bring a clear area into the line of sight. Such vapor shields are disclosed in U.S. Pat. No. 3,169,183 issued Feb. 9, 1965, to Radtke et al.

Replacement of the vapor shields has heretofore required that the welder be shut down and that the vacuum to the welding chamber be broken. Typically, on the order of 30 minutes down time is required to remove and replace the shields and restore the vacuum within the chamber before proceeding with the welding process.

Also, the vapor shields are relatively inaccessible in a typical machine of the type in which they are employed. Consequently, the sheer physical replacement of the shields is time consuming; and this is also an arduous task disliked by the operators of such machines.

These constant interruptions result in reduced welding operations and increased operating costs.

The present invention overcomes the above-discussed drawback of known electron beam welding machines by eliminating the extensive down time heretofore needed for the frequent change of glass vapor shields required because of metal vapor deposits on the shields obscuring the workpieces.

This drawback is overcome, for the first time, by providing a vapor shield exchange apparatus which permits the operator to withdraw used up vapor shields from the welder without breaking the vacuum in the welding chamber. The exchange apparatus is maintained at the vacuum conditions existing within the welder and provides for the ejection of the used shields into a compartment and the insertion of new clear shields onto a support carriage. The support carriage is then returned to its operative position within the welder for continuing operation. The withdrawal and insertion of the vapor shield carriage is manually effected by a push—pull rod accessible to the welding machine operator.

In one exemplary application of my invention, up to 40 shields can be stored in the shield exchange apparatus. As the vacuum in the welding chamber does not have to be broken until this entire supply of vapor shields is depleted, the down time required to change vapor shields is reduced by my invention to a small fraction of that heretofore needed for that purpose.

Another advantage of the novel apparatus I have invented is that it can be added to existing machines as well as being incorporated in such machines as original equipment.

From the foregoing it will be apparent to the reader that one important and primary object of the present invention is to reduce the cost of electron beam welding and other manufacturing operations carried out in machines equipped with optical viewing systems that require protection against the build-up of metal (or other opaque materials) deposited from vapors given off during operation of the machine.

A related, also important and primary object of this invention is the provision of novel, improved apparatus which significantly reduces the down time involved in operating machines of the character just described by making it unnecessary to break the vacuum typically present in such machines each time the shields are replaced.

Another, also related and primary object of my invention is the provision of novel, improved apparatus which significantly facilitates, and simplifies, the mechanical replacement of vapor shields in electron beam welders and other machines equipped with such shields to protect components of optical viewing systems incorporated therein from vapor deposited metal build-up.

Still other related, and important, objects of this invention are the provision of novel apparatuses of the character described above:

which can, from the economic viewpoint, justifiably be added to existing machines;

which allow the machine operator to manipulate the vapor shields to bring unobscured areas thereof into his line of sight when metal deposits build up thereon;

which are capable of housing multiple used up and replacement shields in an environment matching that in the operating chamber of the welder or other machine and of retrieving and replacing shields in that environment, thereby making it necessary to down the machine only when the supply of unused shields in the apparatus is exhausted;

which are so designed that removal of used up shields and the replacement of them can be effected by the simple manipulation of an externally accessible controller rather than by the heretofore necessary partial dismantling of the machine.

Other important objects and advantages and additional features of the present invention will be apparent to the reader from the appended claims and as the ensuing detailed description and discussion of that invention proceeds in conjunction with the accompanying drawing in which:

FIG. 1 is a perspective view of shield changing apparatus embodying the present invention in association with an electron beam welder;

FIG. 2 is a side elevation of the vapor shield changing apparatus and electron beam welder with certain housings partially broken away to show internal components of the welder and shield changing apparatus;

FIG. 3 is a perspective view of the shield changing apparatus showing in detail certain components which functionally cooperate with the electron beam welder;

FIG. 4 is a perspective view similar to FIG. 3 showing a cover plate removed and inverted to show internal components of the apparatus and its cover;

FIG. 5 is an inverted perspective view of a pair of glass vapor shields used up because of the condensing out of opaque materials over their length as they were incrementally advanced during a welding operation;

FIG. 6 is a horizontal transverse section taken along line 6—6 of FIG. 2, showing the shield changing apparatus in secured and operative relationship with the electron beam welder;

FIG. 7 is an enlarged transverse section taken along line 7—7 of FIG. 6, showing in greater detail the functional components of the shield changing apparatus;

FIG. 8 is an enlarged fragmentary view taken along line 8—8 of FIG. 6, with parts broken away, showing the operative components of the apparatus in certain forward and operative positions;

FIG. 9 is a view similar to FIG. 6, showing the apparatus retracted to discard used up and insert unused vapor shields;

FIG. 10 is an enlarged fragmentary section taken along line 10—10 of FIG. 9, showing in detail the components of the vapor shield changing apparatus in their shield transfer positions;

FIG. 11 is a section taken substantially along line 11—11 of FIG. 9 to show more clearly still other internal components of the shield changing apparatus;

FIG. 12 is an enlarged, fragmentary, vertical section taken along line 12—12 of FIG. 2 to show components of the vapor shield changing apparatus in operative and functional relationship with the electron beam welder and its optical viewing system;

FIG. 13 is an enlarged, horizontal, fragmentary section taken along line 13—13 of FIG. 2 to further show the components referred to in the foregoing description of FIG. 12; and FIG. 14 is a perspective view of the optical viewing system of the electron beam welder pictorially depicted in FIG. 1.

Referring now in more detail to the drawings, a high voltage, vacuum type electron beam welder which uses an electron accelerating voltage of 60 KV to 150 KV is generally indicated at 20.

Among the major components of welder 20 is an optical system for viewing the workpiece being welded. That system includes a horizontally mounted, monocular telescope 22 provided with an internal light source 24 and a reflecting mirror 26 and one-way mirror 28 which illuminate that area of the workpiece being welded. The image is transmitted via mirrors 30, 32, and 34 within the welder to the eyepiece of telescope 22. The optical components are supported by structure indicated by reference numeral 29, and they provide an optical line of sight (or sight path) generally coincidental with the vertical electron beam 36 generated within welder 20.

Since cleanliness of the optical system is highly important for viewing the welding process under vacuum conditions, the electron gun 38 is mounted at a distance from the weld area; and it is protected from vapor and other contaminants, while welding, by a lead shield 40 apertured as at 42 for passage of the accelerated electron beam 36 to the workpiece 44.

The latter is mounted on a movable carriage 46 which is integrated into welder 20.

A focusing coil 48 and deflection coil 50 guide the electron beam to the exact position of welding at 52 (FIG. 2).

Still further protection is provided for optical system 29 by a pair of elongated, spaced, light transmitting glass vapor shields 54 and 56 which allow a clear, illuminated view of the welding process through crescents 43 and 45 of the aperture 58 of the optical apparatus. The transparent shields 54 and 56 rest in spaced relationship on a support carriage 60 which is horizontally displaceable to reposition the vapor shields and align an unobscured (or clear) area with the viewing aperture 58 of the optical apparatus 29 as the shields cloud up during the welding process. This renders opaque an area on the lower surface of the shields 54 and 56 at the aperture 58, making viewing difficult.

Repositioning of the shields continues until the entire shield area becomes opaque (FIG. 5), and they must then be replaced.

Describing now in more detail the structure just discussed, the optical viewing system support structure generally indicated by reference numeral 29 comprises a U-shaped bracket 31 (FIG. 14) bolted to the inner face of a monocular telescope support plate 33 by bolts 35. The bottom web 37 of bracket 31 is apertured at 58, providing an opening for passage of the electron beam through a vertically upstanding, cylindrical, electron beam control electrode 39.

The latter is secured in the central aperture 58 to the web 37 of bracket 31 by flanges 41 and bolts 41'. The tube 39 is of a rectangular configuration best seen in FIGS. 13 and 14. This provides the previously mentioned crescent shaped openings 43 and 45 in aperture 58 on opposite sides of the control electrode for illumination and viewing of the workpiece being welded.

The transparent vapor shields are positioned in spaced relationship beneath the crescents 43 and 45 of aperture 58 to prevent metal vapor contamination of the optical components identified above and the lenses of monocular telescope 22.

Specifically, a rectangular opening 47 is provided in the upper web of bracket 31 in mating and secured relationship with electron beam control electrode 39. The angularly disposed mirror 30, which is aligned with the horizontal axis of the monocular telescope, is fastened to an upstanding side web of bracket 31. Mirror 30 deflects the light and the image of the workpiece to the mirrors 32 and 34, which are fastened to the underside of web 37 and positioned so as to deflect light and the image through the crescent shaped openings 43 and 45 of aperture 58 and then through glass vapor shields 54 and 56.

As the metal vapors condense on the shields they become obscured and must be replaced as discussed above. This conventionally results in substantial welding machine down time and increased operating costs because the operator must: stop welding; shut down the equipment; break the vacuum; replace the shield which is an arduous, time consuming task requiring access to the interior of the welder; re-establish the vacuum; and realign the electron beam before resuming welding.

As an example, electron beam welding of one particular large fabrication requires from 3 to 5 hours. During this period, the glass vapor shields must be replaced as many as four times, depending upon the characteristics of the metal being welded. Down time of the welder to replace the vapor shields is approximately 30 minutes; and, consequently, up to two hours of equipment use is lost, resulting in greater costs for both operator and equipment usage time.

The present invention overcomes this loss of time and increase in operating costs by making it possible to remove clouded vapor shields and replace them with clear ones without breaking the vacuum in the welding chamber and without removing casings and other components as was heretofore necessary to gain access to the vapor shields.

These important and heretofore unattainable goals are realized by employing what I term a "vapor shield exchange apparatus" embodying and constructed in accord with the principles of this invention.

Referring now more particularly to FIGS. 3-13, vapor shield exchange apparatus 70 comprises an elongated, rectangular, evacuatable, box-like structure which is mounted beneath telescope 22 and fixedly secured to welder 20.

The box-like housing of vapor shield exchange apparatus 70 includes a bottom wall 72, vertically upstanding side walls 74 and 76, a front end wall 78, and a rear wall 80. The bottom wall 72, the side walls 74 and 76, and upstanding end walls 78 and 80 are joined by welding or the like into a sealed unitary structure. A removable cover 82 for this unit is fixedly secured thereto by bolts 84.

Cover 82 has recessed edges 86 providing a bottom wall section 88 which fits snugly in the box-like housing of apparatus 70. Recesses at the top and in the inner sides of the side and end wall members house an O-ring seal 90, providing an essentially gastight unit when cover 82 is secured by bolts 84 to the exchange apparatus housing.

The front or forward wall 78 of exchange apparatus 70 is secured to the welder in place of an original equipment vapor shield access door by bolts 92 and 94 extending through the telescope support plate 33 at its peripheral flange 96.

An opening 98 in the exchange apparatus front wall 78 permits the vapor shield carriage 60 to be displaced from the welder into exchange apparatus 70.

Opening 98 is positioned beneath and adjacent the lower face of web 37 of bracket 31. An O-ring 100 surrounds opening 98 in a grooved recess 102 of the front upstanding wall 78 of exchanger 70, providing a gastight seal between the welder 20 and vapor shield apparatus exchanger 70 when the latter is assembled to welder 20. Bolts 104 interiorly of the O-ring insure a tight seal when the vapor shield exchange apparatus is assembled to the welder.

Vapor shield carriage 60 has a unitary, vapor shield support base 61 and upstanding side flanges 63 and 65, the height of which is equal to the thickness of the transparent vapor shields. The base 61 is bifurcated as at 67 over a distance approximating the length of the vapor shields which, when in place, in part lie over gap 67 of base 61. This arrangement provides clearance for the electron beam 36 while allowing light and the workpiece image to pass through the vapor shields.

The rearward upper surface of base 61 supports a pair of pivotal, spring biased keepers 69 which secure the spaced transparent glass vapor shields in place.

The carriage and locked on shields are displaced between the welding machine and the vapor shield exchange apparatus by an arrangement which includes a lug 106 fixed to the under side of base 61 adjacent the rear end of vapor shield carriage 60. The lug is apertured to receive a rod 108 which is fixed to the carriage and extends rearwardly through the interior of the exchange apparatus 70. It then passes through the upstanding, exchange apparatus rear wall 80 and terminates at its rearmost end exteriorly of the apparatus in a knob 110. A seal 112 in the rear wall 80 around reciprocable rod 108 accommodates rectilinear movement of the rod while maintaining a gastight seal between the rod and the housing of the vapor shield exchange apparatus.

The rectilinear push-and-pull movement of rod 108 is consequently translated into corresponding movements of carriage 60 which position the vapor in the light and image transmitting optical paths of welder 20 or withdraw the shields and carriage 60 from the welding chamber into the confines of the vapor shield exchange apparatus 70 for exchange of used up and clear vapor shields without breaking the vacuum in the welding chamber.

The vapor shields require replacement when they become opaque over their length due to metal vapor deposition. The operator of the welder then retracts the carriage 60 and the shields 54 and 56 by manually pulling the rod 108 to the left (as welder 20 is oriented in the drawings), thereby drawing carriage 60 into the confines of exchange apparatus 70 through the opening 98 in its forward wall 78.

The support carriage 60 slides into grooves 114 and 116 formed in a spaced pair of longitudinal rails 118 secured in exchange apparatus 70. Rails 118 extend the length of the exchange apparatus and guide vapor shield support carriage 60 as it is moved into and out of that apparatus to eject used up vapor shields and replace them with new ones.

Reference numeral 120 indicates a compartment for ejected, used up vapor shields; and reference numeral 122 identifies a dual magazine compartment for new vapor shields. The mechanism indicated by reference character 124 is for inserting new shields into vapor shield support carriage 60.

As the vapor shield carriage 60 is withdrawn from the welder and moved into exchange apparatus 70, the previously described lug 106 of support carriage 60 engages a cross bar 126 slidably supported on push-pull rod 108. The support carriage 60 and cross bar 126 then continue their rearward travel in unison, first reaching a pair of depending, leaf spring, vapor shield ejectors 128 mounted in grooves 130 which are formed on the bottom side 88 of exchange apparatus cover 82. The springs 128 are spaced transversely of the exchange apparatus to engage the rear ends of the used vapor shields and strip or eject them from support carriage 60 and allow them to fall into the "used up" shield compartment as the carriage continues its rearward travel. That is to say, as the support carriage 60 moves rearwardly in the exchange apparatus to pick up new vapor shields, the springs 128 engage the old shields and hold them stationary as the carriage continues its rearward travel until the used up shields drop into compartment 120. This leaves the support carriage available to receive a pair of new shields from the vapor shield stacks housed in shield compartment 122.

The latter is defined in part by the longitudinal, carriage guiding rails 118 which extend downwardly at 132 into contact with the bottom wall 72 of the vapor shield exchange apparatus 70 (FIG. 10). The rails thus form the side walls of the vapor shield compartment 122. Compartment 122 also has front walls 134 and 136 and rear walls 138 and 140 at the opposite ends of side walls 132. These front and rear walls span the vapor shields making up stacks 54 and 56.

At the inner sides of the forward end walls, and engageable with the shields in stacks 54 and 56, are vertically oriented, stack locating keeper plates 142 and 144. The rear end walls 138 and 140 of the dual stack shield compartment support shield engageable keeper plates 146 and 148 mounted and positioned in a similar manner. The forwardly located keeper plates 142 and 144 and the rearmost keeper plates 146 and 148 thus complete the configuration of two replacement shield magazines 123 and 125 in compartment 122.

The two stacks of shields 54 and 56 are supported on elevator platforms 150 and 152 at the bottom of magazines 123 and 125. The latter elevate the top shields of the stacks into engagement with the bottom, or interior, surface 88 of exchange apparatus cover 82, thereby positively locating the new shields for loading onto support carriage 60.

Initially, cover plate 82 is removed as seen in FIG. 4; and two stacks 54 and 56 of vapor shields are loaded into magazines 123 and 125 on elevator platforms 150 and 152. The elevator platforms are then locked in retracted positions to permit the cover plate 82 to be replaced and secured without damaging the vapor shields.

This locking is accomplished by mechanism which includes a transversely rotatable shaft 154 journalled in walls 132, 134, and 136 (FIGS. 10 and 11) of the vapor shield exchange apparatus. The shaft carries a pair of rearwardly extending crank arms 156 fixed to shaft 154 between the two stacks 54 and 56 of vapor shields. The rear ends of crank arms 156 support outwardly directed stub shafts 158 and 160, and the latter extend into recesses 162 and 164 fashioned on the bottom sides of vapor shield elevator platforms 150 and 152.

Segmental pulleys 166 are fixed to the outer ends of rotatable shaft 154, and each pulley 166 is associated with a tension spring 168 or 170. The rearmost ends of springs 168 and 170 are secured in grooved portions of the segmental pulleys, and the forward ends of the springs are fixed to the outer surfaces of longitudinal rails 118 by studs 172 and 174.

The arrangement just described biases elevator platforms 150 and 152 and the stacks of shields 54 and 56 supported thereon upwardly to locations in which the uppermost shields engage the bottom surface of cover 82 and are thereby properly and precisely positioned for loading onto shield supporting carriage 60.

The initially loaded stacks 54 and 56 of vapor shields are kept out of the way in replacing cover 82 by manually depressing them and the elevator platforms and locking the latter in place with levers 176 and 178. The latter are secured to stub shafts 180 and 182 journalled in blocks 184 and 186 on the under sides of rails 118.

Specifically, after the shields and elevator platforms are manually depressed, the locking levers 176 and 178 are rotated into engagement with the flat faces of the tension spring pulleys 166 which locks the pulleys in place and keeps the elevator platforms from moving upwardly.

Thereafter, the mechanism is unlocked to generate the just described, upwardly directed force on and location of the vapor shields loaded into magazines 123 and 125 for transfer to carriage 60.

The arrangement for unlocking the elevator mechanism includes trips or levers 188 and 190 so fixed to the inner ends of stub shafts 180 and 182 as to be engaged by the previously described cross bar 126 as it is moved rearwardly with the vapor shield support carriage 60 by actuation of push-pull rod 108. Axial movement of the push-pull rod to the left as shown in the drawings consequently effects a rotation of stub shafts 180 and 182 that rotates locking levers 176 and 178 out of engagement with the flat faces of pulleys 166. This allows the latter to rotate, permitting springs 168 and 170 to apply upwardly acting forces to the vapor shield elevator platforms via the pulleys and crank arms 156.

With the spent or clouded shields ejected and the vapor shield elevator mechanism unlocked, right-to-left movement of push-pull rod 108 actuates the injector mechanism 124 alluded to above, causing a new pair of shields to be loaded into vapor shield support carriage 60.

The injector mechanism includes a plate 192 slightly thinner than vapor shields 54 and 56. It straddles the longitudinal side rails 118, and its outer edges terminate in downwardly extending flanges 194 and 196, which guide the plate along the rails, and in fingers 198 and 200.

Injector plate 192 is held against side rails 118 for reciprocable sliding movement therealong by top cover 82 (FIGS. 10 and 11).

The injector plate also has spaced injector fingers 202 and 204 which engage the rear ends of the uppermost vapor shields in magazines 123 and 125, strip them from stacks 54 and 56, and then load them into support carriage 60 as the push-pull rod 108 is manipulated.

Forward and rearward movements of the injector plate 192 required in loading the unused vapor shields are generated by the manipulation of push-pull rod 108. In particular, to generate the necessary forward movement, cables 206 and 208 are secured to the fingers 198 and 200 of injector plate 192. The cables extend forwardly and around direction changing pulleys 210 and 212 and are secured to the outer ends of cross bar 126.

The pulleys are rotatably mounted adjacent the inner face of vapor shield exchange apparatus front wall 78 on blocks 214 and 216 secured to the outer faces of side rails 118. Side rails 118 are slotted at 218 and 220 to accommodate the rotatable pulleys and cables 206 and 208.

Rearward travel of the injector plate 192 is provided by cables 222 and 224 secured to the rear portions of fingers 198 and 200 and trained around direction changing pulleys 226 and 228 rotatably journalled on blocks 230 and 232 secured to side rails 118 adjacent the inner face of vapor shield exchange apparatus rear wall 80. Cables 222 and 224 then extend forwardly in the exchange apparatus 70 and are connected to tension springs 234 and 236. The latter are fixedly secured at their opposite ends by bolts 238 and 240 to the inner faces of the side walls 74 and 76 of exchange apparatus 70.

As the opaque, used up vapor shields and support carriage 60 are retracted from welder 20 by pulling on push-pull rod 108, the carriage associated lug 106 engages cross bar 126; and the carriage and cross bar thereafter move in unison toward the rear or outermost end of the vapor shield exchange apparatus. Cables 206 and 208 consequently displace injector plate 192 forward from the position to which it is biased by springs 234 and 236 (FIG. 4) toward the forward or machine end of the vapor shield exchange mechanism (FIG. 9), stripping the uppermost vapor shields from stacks 54 and 56 and transferring them onto vapor shield support carriage 60. As rod 108 is subsequently pushed forward to move the newly loaded carriage into the welding machine, the springs retract the injector to its FIG. 4 initial position and displace cross bar 126 to the position shown in the same Figure.

To summarize, the initial step in operating the exemplary machine 20 of the present invention described above to provide for long term, uninterrupted electron beam welding under vacuum conditions is the removal of cover 82 of the vapor shield exchange apparatus 70. This permits a large number of transparent vapor shields to be loaded into magazines 123 and 125 of vapor shield compartment 122. Vapor shield elevator platforms 150 and 152 are then locked in a "down" position by locking levers 176 and 178 to facilitate the then carried out replacement of cover 82.

A vacuum is next established in the working chamber of welding machine 20 and in exchange apparatus 70.

The initial pair of vapor shields is then stripped from the stacks 54 and 56 in exchange apparatus magazines 123 and 125 and loaded onto vapor shield carriage 60; and the shields and carriage are moved into the machine to protect the optical components of the machine's workpiece illumination and viewing systems against the condensation of metal vapors thereon.

In the first cycle of vapor shield exchange the operator pulls rod 108 to the left (with welder 20 oriented as shown in the drawings), withdrawing vapor shield carriage 60 from the welder into the guide grooves 114 and 116 formed in the vapor shield carriage locator rails 118 of vapor shield exchange apparatus 70. As vapor shield support carriage 60 enters the vapor shield exchange apparatus 70, the lug 106 on its bottom side contacts the cross bar 126 which then travels rearward in unison with support carriage 60 as the operator continues to pull rod 108 to the rear. As the cross bar 126 travels in the rearward direction, the cables 206 and 208 connected to shield injector 124 consequently draw the plate 192 of the latter forward to the vapor shield magazines 123 and 125.

Thereafter, as the cross bar 126 and support 60 continue their rearward travel, cross bar 126 engages the unlocking levers 188 and 190, displacing then out of engagement with the locking faces of the vapor shield elevator pulleys 166. This permits elevator platforms 150 and 152 to raise the dual stacks of vapor shields 54 and 56 into engagement with the under side of exchange apparatus cover 82 and into alignment with the injector fingers 202 and 204 of injector plate 192.

Thereafter, as injector plate 192 continues its forward movement, it strips the top shields from stacks 54 and 56 and guides them past keepers 69 onto vapor shield support carriage 60. This operation is completed as the carriage reaches its rearward limit of travel; and the keepers are thereupon swung outwardly by their biasing springs, locking the shields in place on the carriage.

The operator next pushes rod 108 forwardly to the right from the FIG. 9 limit position to its FIGS. 4 and 6 limit position. This moves the support carriage 60 forwardly and locates the carriage in the welding machine with the left-hand ends of the shields in the path of illumination and in the line of sight of the machine's optical viewing system.

At the same time springs 234 and 236 return the vapor shield injector to its rearmost position and restore cross bar 126 to its FIG. 6 position. The elevator mechanism concurrently raises the two stacks 54 and 56 of vapor shields, positioning the new uppermost pair against the bottom of shield exchange apparatus cover 82 for engagement by the shield injector in the next shield exchanging cycle of the vapor shield exchange apparatus.

As welding continues and the vapor shields become clouded, the operator incrementally retracts push-pull rod 108 to the right, exposing clear areas of the shields. This is continued until the shields are clouded over their length (FIG. 2); and the shields are then exchanged for clear ones.

This is accomplished by repeating the vapor shield exchange cycle; and the cycle proceeds as just described except that, as push-pull rod 108 is retracted to the right, the used up vapor shields are engaged and stripped from carriage 60 by ejectors 128. The shields fall into the used shield compartment 120, leaving the shield carriage in a condition to receive the two new shields guided onto the carriage by shield injector 124 as the support carriage 60 is moved rearwardly.

The reader will of course recognize that many modifications may be made in the exemplary machine described above without exceeding the scope of the present invention. For example, by only minor modifications to the illustrated mechanism, the manipulation of the push-pull rod required to unlock the vapor shield elevating mechanism can be eliminated.

Exemplary mechanism for this purpose, shown in FIGS. 7, 8, and 11, comprises two spring loaded pins 242 and 244. When depressed, these pins engage unlocking levers 188 and 190, rotating stub shafts 180 and 182 and pivotally displacing levers 176 and 178 out of engagement with the locking faces of segmental pulleys 166. This allows vapor shield elevator platforms 150 and 152 to raise the spaced stacks of clear vapor shields 54 and 56 nested in magazines 123 and 125 in the manner discussed above.

Another exemplary modification which can be employed to particular advantage is the provision of a vent in the vapor shield exchange apparatus: for example, in the rear wall 80 of the latter as indicated by reference character 246 in FIGS. 8 and 11.

Directly communicating the working chamber of a welding machine such as that described above with the ambient surroundings to change vapor shields during the welding of a large workpiece as has heretofore been necessary is undesirable because this creates turbulence in the working chamber, stirring up foreign material which can subsequently settle out on the workpiece and become incorporated in the weld. By instead venting the workpiece through the vapor exchange apparatus, if it does become necessary to break the vacuum during a welding operation— to reload the exchange apparatus with a fresh supply of vapor shields, for example—this can be avoided.

Other machines embodying the precepts of my invention will likewise vary in construction and appearance from the exemplary electron beam welder described above; and those precepts can also be applied, as examples—to machines intended for such different purposes such as cutting and drilling; to machines employing other energy sources such as lasers; and to machines in which an inert gas rather than a vacuum is employed to maintain the workpiece in a controlled environment.

The embodiments of my invention illustrated and described above are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent of the United States is:

1. A machine for processing workpieces by a technique in which vapors condensible to opaque materials are generated, said machine including: an optical system for viewing the workpiece during the processing thereof; a disposable shield for intercepting said condensible vapors and thereby protecting the components of the optical system from the build-up of opaque materials condensed from said vapors; means for supporting said shield in an optical path of said viewing system; means housing the workpiece, the optical system, and the shield in a protective environment; storage means outside of said housing means in which shields as aforesaid can be maintained in an environment matching that of the workpiece; and externally accessible, operator actuatable means for displacing said supporting means and shields clouded by the build-up of vapor deposited materials thereon from said optical path to said storage means, for ejecting said clouded shields from said supporting means into said storage means, for transferring unclouded shields from said storage means to said shield supporting means, and for so displacing said supporting means as to position said shield in the optical path of said machine.

2. A machine for processing workpieces by a technique in which vapors condensible to opaque materials are generated, said machine including: an optical system for viewing the workpiece during the processing thereof; a shield for intercepting said condensible vapors and thereby protecting the components of the optical system from the build-up of opaque materials condensed from said vapors; means for supporting said shield in an optical path of said viewing system; storage means in which shields as aforesaid can be maintained in an environment matching that of the workpiece; and externally accessible, operator actuatable means for displacing said supporting means and shields clouded by the build-up of vapor deposited materials thereon from said optical path to said storage means, for ejecting said clouded shields from said supporting means into said storage means, for transferring unclouded shields from said storage means to said shield supporting means, and for so displacing said supporting means as to position said shield in the optical path of said machine, said optical system including means for illuminating said workpiece; said vapor shield supporting means comprising means for supporting vapor shields as aforesaid in the optical path between said workpiece illuminating means and the workpiece and in the optical viewing path; said operator actuatable means comprising means as aforesaid for displacing said supporting means and shields obscured by the build-up of vapor deposited materials thereon from said optical path to said storage means, for ejecting said obscured shields from said supporting means into said storage means, for transferring unclouded shields from said storage means to said shield supporting means, and for so displacing said supporting means as to position said shields in the aforesaid optical paths of said machine; and said storage means comprising means accommodating two separate stacks of unclouded shields which are concomitantly transferable to said shield support means by said operator actuatable means.

3. A machine as defined in claim 1 in which said storage means comprises a compartment for used up shields ejected from said shield supporting means.

4. A machine as defined in claim 1 which comprises means for so accommodating incremental movement of said shield supporting means relative thereto as to locate successive unclouded portions of said shield in said optical path.

5. A machine for processing workpieces by a technique in which vapors condensible to opaque materials are generated, said machine including: an optical system for viewing the workpiece during the processing thereof; a shield for intercepting said condensible vapors and thereby protecting the components of the optical system from the build-up of opaque materials condensed from said vapors; means for supporting said shield in an optical path of said viewing system; storage means in which shields as aforesaid can be maintained in an environment matching that of the workpiece; and externally accessible, operator actuatable means for displacing said supporting means and shields clouded by the build-up of vapor deposited materials thereon from said optical path to said storage means, for ejecting said clouded shields from said supporting means into said storage means, for transferring unclouded shields from said storage means to said shield supporting means, and for so displacing said supporting means as to position said shield in the optical path of said machine, said storage means having a removable cover means furnishing access to the interior of said storage means, an elevator means for elevating a stack of vapor shields supported thereon and thereby bringing the topmost shield in said stack to a position in which it can be transferred to said shield supporting means by operation of said operator actuatable means, means for locking said elevator means in a retracted position to facilitate the replacement of said cover, and externally accessible means which can be actuated with said cover in place to unlock said elevator means and thereby make it effective to elevate said shields as aforesaid.

6. A machine as defined in claim 5 wherein the means for unlocking said elevator means is incorporated in said operator manipulatable means.

7. Vapor shield support and exchange apparatus, comprising: an essentially gastight housing which can consequentially be matched to the environment in a machine with which said apparatus is employed; a vapor shield support carriage; means for retracting said carriage into said housing; a vapor shield magazine in said housing; means for stripping a used up shield from said carriage as said carriage is retracted into said housing; and means operable in response to a subsequent displacement of said carriage in and relative to said housing for transferring an unused vapor shield from said magazine to said support carriage.

8. Vapor shield support and exchange apparatus as defined in claim 7 which includes means operable subsequent to the transferring of said unused vapor shield from said magazine to said carriage to shaft said carriage out of said housing and into the machine with which said apparatus is associated.

9. Vapor shield support and exchange apparatus as defined in claim 8 wherein the means for retracting said carriage into said housing, for stripping a used up shield therefrom, for transferring an unused shield to the carriage, and for thereafter shifting it out of the housing includes a manually manipulatable actuator.

10. Vapor shield support and exchange apparatus as defined in claim 7 which includes a spring biased keeper for retaining said vapor shield in plane on said vapor shield support carriage.

11. Apparatus as defined in claim 7 wherein said housing includes a removable cover, wherein the means for retracting the vapor shield carriage into said housing comprises means for guiding it and the used up shield supported thereon in a rectilinear path subjacent the cover, and wherein the means for stripping said shield from said carriage comprises an ejector supported from said cover in the path of the used up vapor shield.

12. Vapor shield support and exchange apparatus as defined in claim 7 wherein said housing has a compartment for used up vapor shields stripped from said vapor shield support carriage.

13. Vapor shield support and exchange apparatus as defined in claim 7 which includes means for guiding said carriage along a rectilinear path as it is retracted into said housing and means in said housing for elevating the uppermost shield in said vapor shield magazine to the path of said carriage, the means for transferring said unused vapor shield from said magazine to said carriage including an injector and means operable concomitantly with said subsequent displacement of said carriage for displacing said injector along a path so located that, as it is displaced, said injector will engage said uppermost shield and shift it along a rectilinear path from said magazine onto said vapor shield carriage.

14. Vapor shield support and exchange apparatus as defined in claim 13 wherein the means for displacing said carriage as aforesaid includes an elongated, operator accessible actuator fixed at one end to said vapor shield support carriage and extending longitudinally through said housing to the exterior thereof, the means for displacing said vapor shield injector as aforesaid comprising a member slideably mounted on said elongated actuator means, means associated with said carriage for engaging said member and thereby moving it in unison with said carriage as the latter is retracted into said housing, motion transmitting cables connected between said slideably mounted member and said injector, and pulley means over which said cable is trained for reversing the direction of movement of said injector relative to said slideably mounted member.

15. Vapor shield support and exchange apparatus as defined in claim 14 which includes spring actuated means for restoring said slideably mounted member to the position from which said member is displaced by the retraction of said carriage as the latter is shifted out of said housing into the machine with which said apparatus is associated.

16. Vapor shield support and exchange apparatus as defined in claim 15 wherein the means for restoring said slideably supported member as aforesaid comprises tension spring means fixed at one end relative to said housing, direction changing pulley means, and a flexible cable means, the latter being connected at one end to the other end of said tension spring means and at its other end to said injector.

17. Vapor shield support and exchange apparatus as defined in claim 7 which includes means for shifting said carriage subsequent to the transfer of an unused vapor shield from said magazine thereto out of said housing into the machine with which said apparatus is associated, means for guiding said carriage along a rectilinear path as it is retracted into and shifted out of said housing, and an externally accessible actuator, said actuator extending longitudinally through said housing with one end of the actuator thereby being accessible from the exterior of the housing, said vapor shield support carriage being fixed to the other end of said actuator.

18. Vapor shield support and exchange apparatus as defined in claim 17 which includes parallel, spaced apart rails for guiding said vapor shield support carriage along said rectilinear path as said carriage is moved in and relative to said housing.

19. Vapor shield support and exchange apparatus as defined in claim 7 which includes a vapor shield support platform in said vapor shield magazine and means for so elevating said platform and vapor shields supported thereon as to bring the uppermost of said shields into alignment with said vapor shield support carriage for transfer of said shield from said magazine to said carriage.

20. Vapor shield support and exchange apparatus as defined in claim 19 wherein said housing has a cover which can be removed to load unused vapor shields into said magazine and wherein said apparatus includes means for locking said elevator platform in a depressed position to facilitate the replacement of said cover following the loading of shields into said magazine.

21. Vapor shield support and exchange apparatus as defined in claim 20 which includes means accessible from the exterior of said housing for subsequently removing the constraint on the movement of said elevator platform.

22. Vapor shield support and exchange apparatus as defined in claim 21 which includes means operable in response to the displacement of said vapor shield support carriage in and relative to said housing for effecting the removal of said constraint on said elevator platform.

23. Vapor shield support and exchange apparatus as defined in claim 19 wherein the means for elevating said vapor shield support platform as aforesaid comprises a rotatably mounted member, means carried by said member and engageable with said platform to elevate the latter as said member is rotated, and a tension spring means for rotating said member, one end of said tension spring means being fixed relative to said member and the other end being fixed relative to said housing.

24. Vapor shield support and exchange apparatus as defined in claim 23 wherein said housing has a cover which can be removed to load unused vapor shields into said magazine, said apparatus including means for locking said vapor shield support platform in a depressed position to facilitate the replacement of said cover following the loading of shields into said magazine and a transversely extending, rotatably supported shaft supporting said rotatably mounted member from said housing, the means for locking said elevator in said depressed position including a locking member fixed to said shaft for rotation therewith and a latch which is manually manipulatable with said housing cover removed into engagement with said locking member to preclude rotation of said shaft.

25. Vapor shield support and exchange apparatus as defined in claim 24 which includes means operable by the displacement of said vapor shield support carriage within said housing subsequent to the replacement of said cover to move said latch out of engagement with said locking member and thereby free said vapor shield support platform for upward movement as aforesaid, said last-mentioned means comprising a trip means fixed to said rotatably supported shaft for rotation therewith and extending into the path of said vapor shield support carriage whereby, as said carriage is displaced within said housing, it will engage said trip, thereby effecting rotation of said trip and said rotatably supported shaft and consequentially pivoting said latch out of engagement with said locking member.

26. Vapor shield support and exchange apparatus as defined in claim 7 together with means mounted in one end of said housing and on the external side thereof for providing a gastight seal between said housing and apparatus with which the vapor shield support and exchange apparatus is associated.

* * * * *